United States Patent [19]

Smith

[11] Patent Number: 5,251,538

[45] Date of Patent: Oct. 12, 1993

[54] PREHENSILE APPARATUS

[75] Inventor: Christopher M. Smith, Richland, Wash.

[73] Assignee: Battelle Memorial Institute, Richland, Wash.

[21] Appl. No.: 748,989

[22] Filed: Aug. 21, 1991

[51] Int. Cl.$^5$ .............................................. F01B 19/00
[52] U.S. Cl. ......................................... 92/34; 92/92
[58] Field of Search ................... 92/89, 90, 91, 92, 48, 92/34

[56] References Cited

U.S. PATENT DOCUMENTS

| | | | |
|---|---|---|---|
| 2,404,801 | 7/1946 | Hollerith | 92/92 |
| 3,343,864 | 9/1967 | Baer | 92/92 |
| 3,601,442 | 8/1971 | Orndorff, Jr. | 92/91 |
| 3,924,519 | 12/1975 | England | 92/92 |
| 3,981,528 | 9/1976 | Andorf et al. | |
| 4,833,973 | 5/1989 | Wang | 92/92 |
| 5,018,506 | 5/1991 | Danna et al. | 92/92 |
| 5,079,999 | 1/1992 | Negishi et al. | 92/48 |
| 5,080,000 | 1/1992 | Bubic | 92/48 |
| 5,083,498 | 1/1992 | Sato et al. | 92/92 |

FOREIGN PATENT DOCUMENTS 0714063  2/1980  U.S.S.R. ............................ 92/92

OTHER PUBLICATIONS

IBM Technical Disclosure Bulletin *Diaphragm Actuator* by G. A. Lemke Nov. 1965.

Mahajan, Umesh; "Mechanics of a Continuous Manipulator made of a Nonlinear, Composite Material"; Aug. 1985.

Palaniappan, Murugappan; "Large Deflections of Continuous Elastic Structures"; Jun. 1986.

*Primary Examiner*—Thomas E. Denion
*Attorney, Agent, or Firm*—Paul W. Zimmerman

[57] ABSTRACT

The present invention relates to an apparatus for handling a workpiece comprising a vessel that is longitudinally extensible and pressurizable, and a nonextensible and laterally flexible member on the vessel. The member constrains one side of the vessel to be nonextensible, causing the vessel to bend in the direction of the nonextensible member when pressurized.

5 Claims, 3 Drawing Sheets

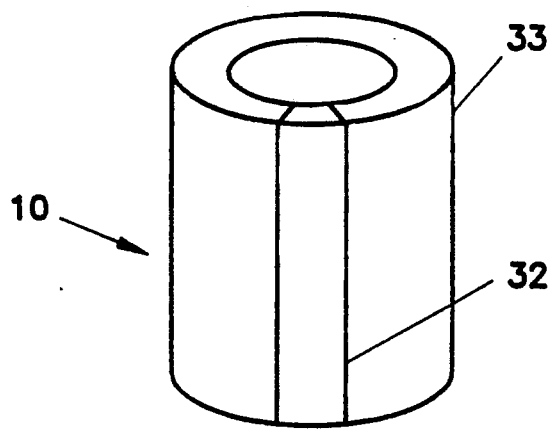
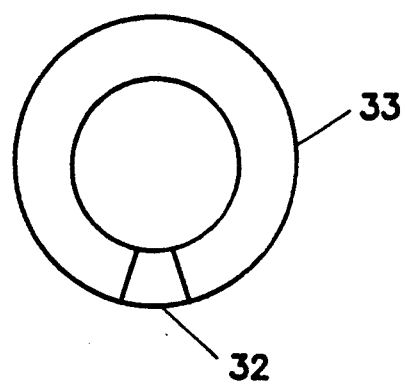
FIGURE 5A
FIGURE 5B
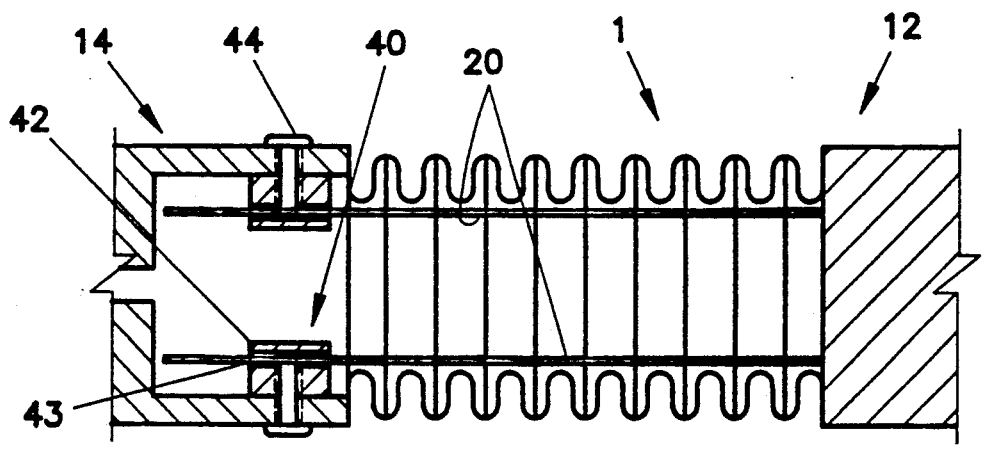
FIGURE 6
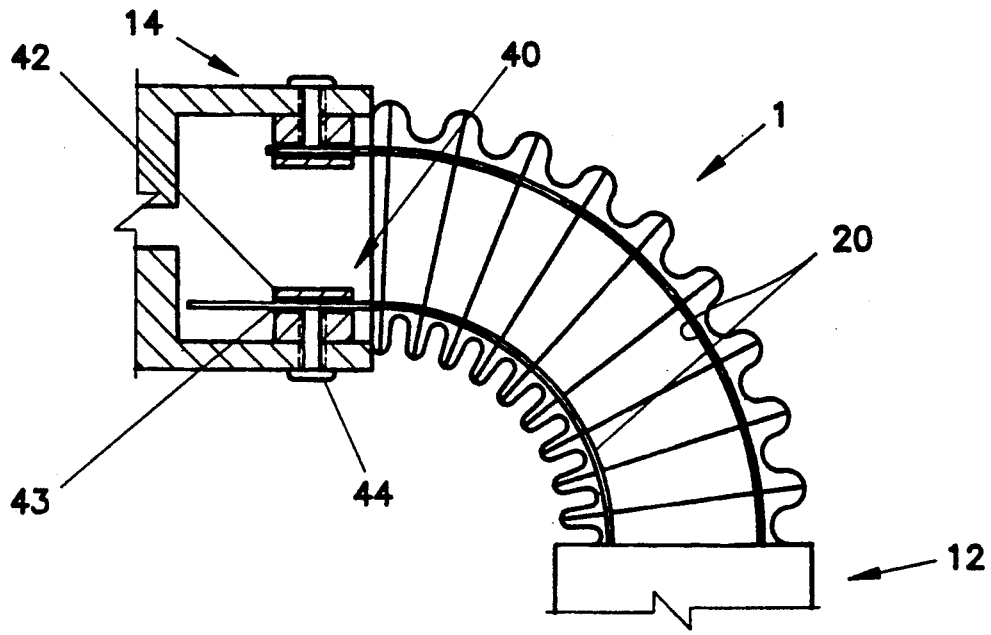
FIGURE 7

PREHENSILE APPARATUS

This invention was made with Government support under Contract DE-AC06-76RLO 1830 awarded by the U.S. Department of Energy. The Government has certain rights in the invention.

FIELD OF THE INVENTION

The present invention relates generally to an apparatus for handling a workpiece. More specifically the present invention relates to a vessel that is longitudinally extensible, pressurizable and laterally flexible having a member that is nonextensible and laterally flexible biasing the vessel when pressurized.

The term "laterally flexible" as used herein refers to bendable or curlable in a general sense that is not limited by a particular item. Examples of laterally flexible items include but are not limited to chains, springs, ropes, strings, wires, bellows, and elastomeric tubing. Chains wires, rope, and string, in addition to being laterally flexible, are also non-extensible.

BACKGROUND OF THE INVENTION

Remote handling of workpieces is required in many applications including but not limited to radioactive material handling, hazardous material handling automated assembly and manufacturing, automated warehousing, agricultural harvesting, underwater activities including mining, space exploration, and prostheses. Many of these applications require remote handling apparatus that imitate human limbs or extremities.

Several imitation hand designs are in use. These designs are predominately jointed and use cables as tendons to effect motion. Other variations use hydraulic cylinders instead of cables to effect motion. Still others use assemblies of gears, linkages, and motors. These designs generally have a limited range of force especially in a gripping mode and are limited in the types and shapes of workpieces that may be handled.

Some designs imitate the action of muscles by using fluid pressure. One in particular reported in Design News, Feb. 12, 1990 under the title "Pneumatic Muscles Guide Videoprobe", shows an air bladder within a braid. Air pressure inflates the bladder causing the braid to expand radially. The radial expansion shortens the length of the braid, thereby pulling on a workpiece. This design is useful in applying a linear force to a workpiece.

The need exists for a prehensile apparatus for handling a workpiece having a wide range of applied force, an ability to apply handling forces in many directions, and an ability to handle various types and shapes of workpieces.

SUMMARY OF THE INVENTION

The present invention is a prehensile apparatus for handling a work piece comprising two basic elements. The first element is a vessel that is longitudinally extensible, pressurizable, and laterally flexible, having one end that is closed and another end that is open for receiving pressure. The second element is a member that is longitudinally nonextensible and laterally flexible having a length corresponding to the length of the vessel and attachable to the vessel. The nonextensible member constrains a side of the vessel to be nonextensible, and causes it to curl into a semi-toroidal shape when pressurized.

The prehensile apparatus of the present invention has the advantages of (1) simple operation since only fluid pressure is required to actuate it, (2) simple construction, (3) inexpensive to construct and operate, and (4) likeness of human extremities.

The subject matter of the present invention is particularly pointed out and distinctly claimed in the concluding portion of this specification. However, both the organization and method of operation, together with further advantages thereof, may best be understood by reference to the following description taken in connection with accompanying drawings wherein like reference characters refer to like elements.

BRIEF DESCRIPTION OF THE DRAWINGS

FIG. 5a is an isometric view of a vessel.

FIG. 5b is a top view of a vessel.

FIG. 6 is a longitudinal cross section of an unpressurized prehensile apparatus, elbow type.

FIG. 7 is a longitudinal cross section of a pressurized prehensile apparatus, elbow type.

DESCRIPTION OF THE PREFERRED EMBODIMENT(S)

Figure 1:
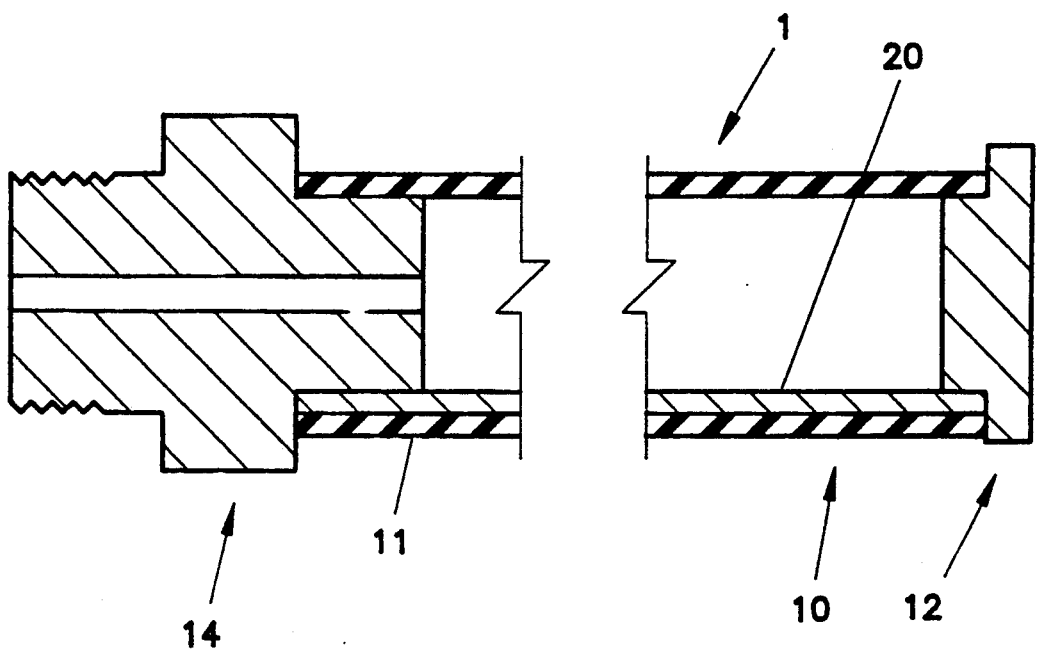
FIG. 1 is a longitudinal cross section of an unpressurized prehensile apparatus, finger type.
Figure 2:
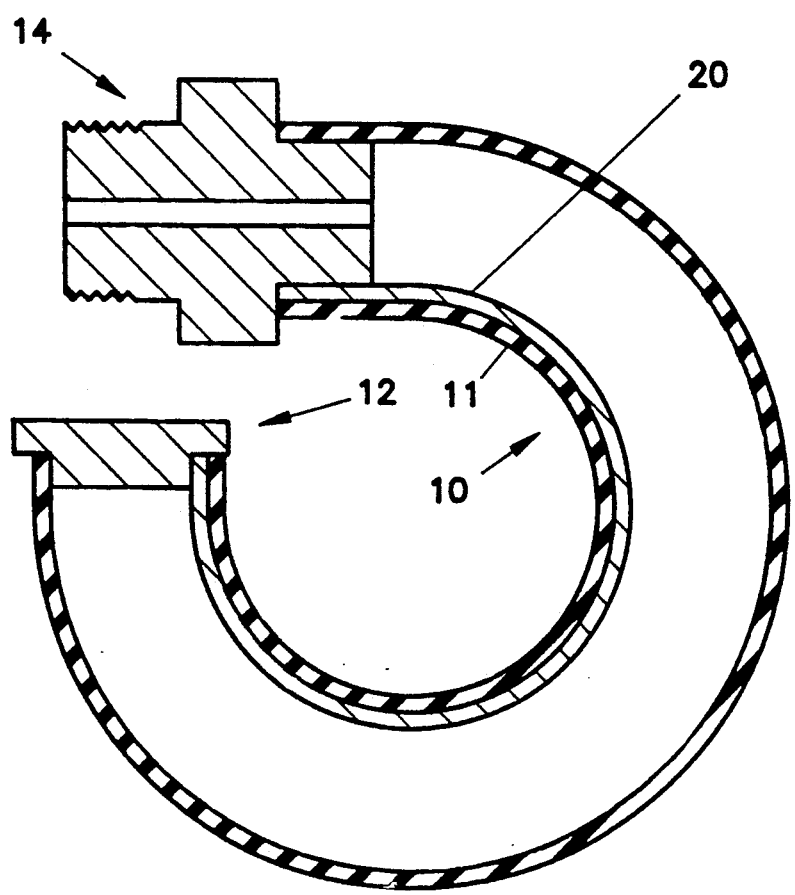
FIG. 2 is a longitudinal cross section of a pressurized prehensile apparatus, finger type.

The present invention is illustrated in FIG. 1. The prehensile apparatus (1) comprises two basic elements. The first basic element is a vessel (10) having a wall (11) that is longitudinally extensible, pressurizable, and flexible, having a first end (12) that is closed and second end (14) that is open for receiving pressure. The second basic element is a member (20) that is longitudinally nonextensible and laterally flexible having a length corresponding to the length of the vessel (10). The member (20) constrains one side of the vessel (10) to be nonextensible, and causes it to bend in the direction of the nonextensible member (20) when the vessel (10) is pressurized as shown in FIG. 2. The gripping force is determined by the fluid pressure and the distance between the center of the vessel (10) and the member (20).

The prehensile apparatus (1) may be configured to mimic human handling motions including but not limited to finger and elbow motions. These motions are achieved by constraining the member (20) to bend with the vessel (10). Although prehensile motion may be obtained when the vessel (10) bends independently of the member (20), it is not preferred.

Because the vessel wall (11) is longitudinally extensible, it does not have a fixed length. The vessel (10) will, however, have a free length corresponding to an unpressurized condition. Thus, the length of a member (20) may correspond to a free length of the vessel (10), or it may correspond to longer or shorter lengths for particular applications.

Figure 3:
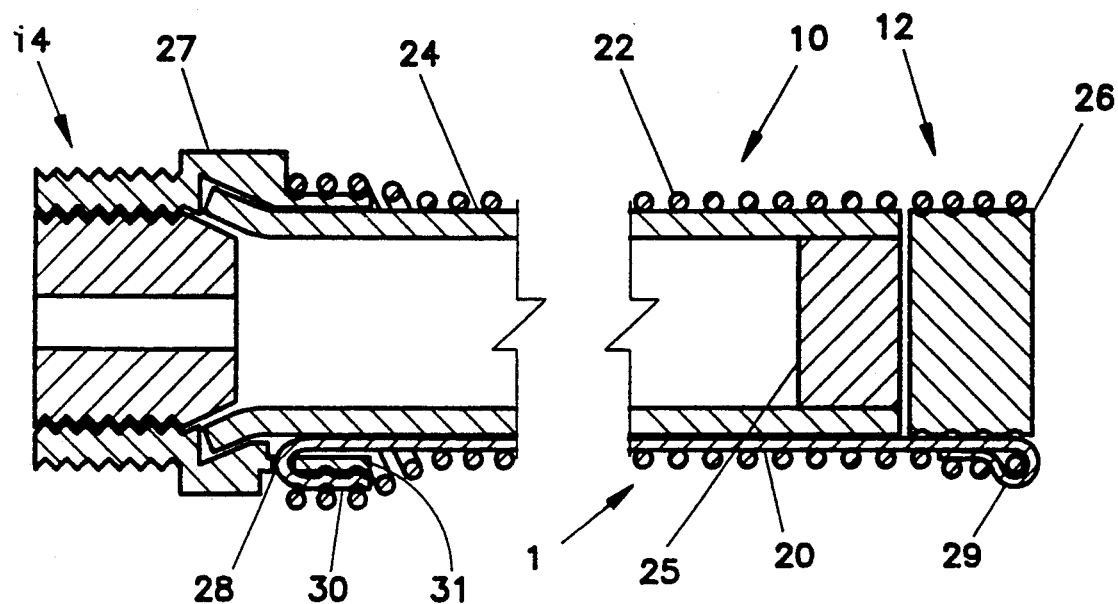
FIG. 3 is a longitudinal cross section of an unpressurized exterior spring gripping apparatus, finger type.

In a finger type preferred embodiment shown in FIG. 3, the vessel wall (11) comprises an outer spring (22), and an elastomeric tube (24). The first end (12) of the vessel (10) comprises a tube end plug (25), and a spring end plug (26) while the second end (14) comprises a fitting (27). In this embodiment, the member (20) is a thin metal band of shim stock secured within the vessel wall (11) between the outer spring (22) and the elastomeric tube (24). The vessel (10) may be of any cross section.

The member (20) is attached to the vessel (10) at the first end (12) by wrapping the first end (29) of the member (20) around the last coil of the outer spring (22). The member (20) is attached to the vessel (10) at the second end (14) by inserting the second end (30) of the member (20) through a first slot (28) in the fitting (27). The outer spring (22) is placed over an extension (31) of the fitting (27) and the second end (30) of the member (20) to hold the member (20) in place.

The member (20) may be attached to the vessel (10) by any means including but not limited to gluing, spot welding, and weaving through the spirals of an outer spring (22).

The member (20) may be thin metal shim stock placed between the outer spring (22) and the elastomeric tube (24) as illustrated in a preferred embodiment or it may be placed on the outside of the spring. The member (20) may be single or multiple cords, wires or bands, of metal, nylon, or other material and may be placed either inside or outside the vessel wall (11) or embedded within the vessel wall (11).

The member (20) need not be separate and distinct from the vessel (10). As illustrated in FIG. 5, the member (20) may be a variation in material properties on a side of the vessel (10) such that a longitudinal section (32) of the vessel (10) has material properties different from the remaining cross section (33) of the vessel (10) thereby causing the vessel (10) to bend when pressurized. Material properties include but are not limited to cross section area, density, Young's modulus, and chemical composition.

The member (20) need not be continuous. Multiple elements, e.g. links of a chain, may be used to connect convolutions of a bellows or loops of a spring.

The prehensile apparatus (1) may be used as a joint as well as a finger as illustrated in FIGS. 6 and 7. When used as a joint, the first end (12) and the second end (14) may comprise a greater proportion of the overall length of the prehensile apparatus (1) than the extendable portion.

The outer spring (22) may be replaced by any longitudinally extensible element including but not limited to bellows or braid. Additionally, both the elastomeric tube (24) and the outer spring (22) may be replaced by a bellows.

When the vessel (10) is a bellows, the member (20) may be inside, outside, or integral to the wall of the bellows. When the member (20) is on the outside, it may be attached by exterior coils of string, wire, or other suitable material. When the member (20) is on the inside, it may be attached at its ends.

The direction of bending may be controlled with a plurality of members (20) positioned around the circumference of the vessel (10) and which are selectably attachable to the vessel (10). In this embodiment, the length of the elements comprising the member (20) corresponds to an extended length of the vessel (10). One end of each member (20) is attached to one end of the vessel (10) by any permanent attachment means including but not limited to those previously discussed, while the other end of each member is not permanently attached but is selectably attached.

The selectable attachment includes but is not limited to the mechanical attachment (40) shown in FIGS. 6 and 7. In this embodiment, a block (42) having a second slot (43) is attached to the first end (12) of the vessel (10). The member (20) is slideably inserted into the second slot (43). The member (20) is selectively attached with a screw (44) bearing upon the member (20) against one side of the second slot (43).

Additionally, the direction of bending may be controlled by a rotatable vessel (10). In this embodiment, the second end (14) of the vessel (10) may comprise a fitting (27) which may be rotated about the longitudinal axis of the vessel (10), for example, a quick disconnect fitting, or a compression fitting. An operator positions the vessel (10) with the member (20) facing the desired direction prior to tightening or inserting the fitting. Other types of fittings (27) allow rotation of the vessel (10) while pressurized.

The prehensile apparatus (1) is actuated by introducing pressure into the vessel (10) and preferably into an elastomeric tube (24). The outer spring (22) prevents the elastomeric tube (24) from expanding radially, and constrains it to expand longitudinally. Because the member (20) constrains a side or longitudinal section of the vessel (10) from expanding longitudinally, and the unconstrained longitudinal sections are allowed to expand, the vessel (10) bends in the direction of the member (20) when the vessel (10) is pressurized.

Figure 4:
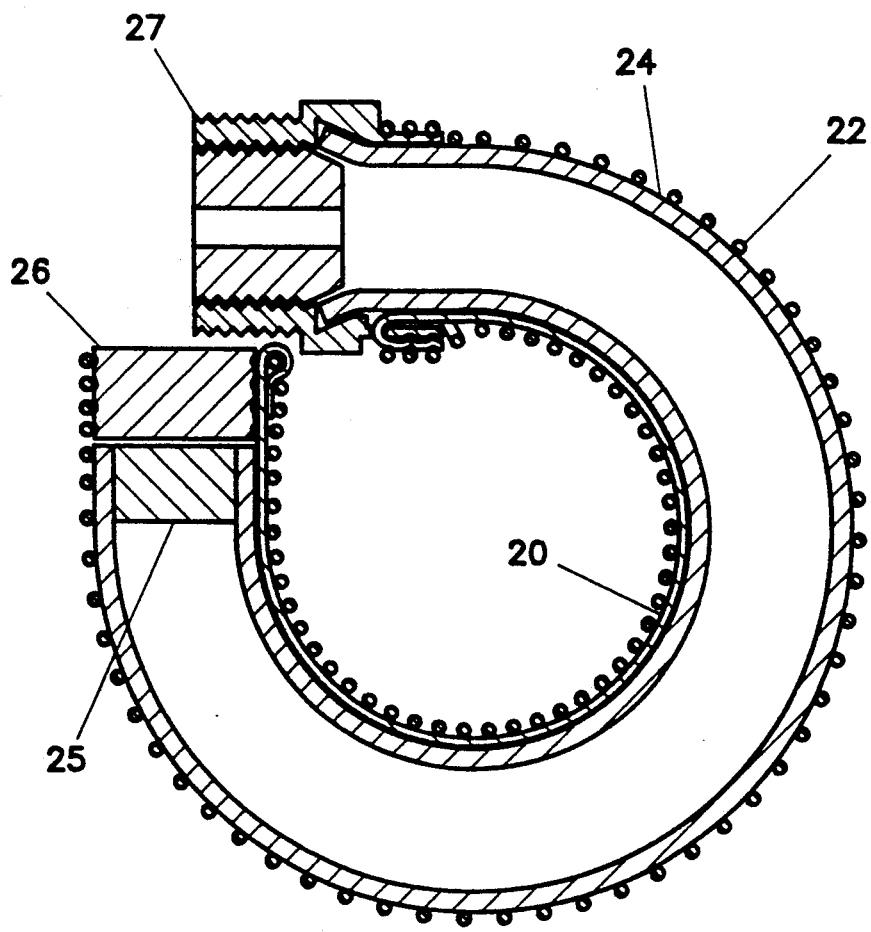
FIG. 4 is a longitudinal cross section of a pressurized exterior spring gripping apparatus, finger type.

The vessel (10) will assume a semi-toroidal shape (FIG. 4) when pressurized in the absence of a workpiece. In the presence of a workpiece, the vessel (10) will conform to the outer shape of the work piece.

The workpiece may be in direct contact with the coils of the outer spring (22). Additionally, the outer spring (22) may be covered with a material including but not limited to cloth, rubber, leather, or sensory material to improve the grip or protect the workpiece. The grip may rely on closure of the coils of the outer spring (22) or the convolution of a bellows to achieve a pinch effect.

A plurality of vessels (10) may be attached to a common header to form a multi-gripper assembly or "hand".

Pressurization of the apparatus may be accomplished with any fluid. Compressible fluids including but not limited to air, and nitrogen are preferred. The pressure may be provided by a hand pump, for example a bicycle pump, or by a motor driven compressor.

While preferred embodiments of the present invention have been shown and described, it will be apparent to those skilled in the art that many changes, modifications and combinations of elements may be made without departing from the invention in its broader aspects. The appended claims are therefore intended to cover all such changes, modifications, and combinations of elements as fall within the true spirit and scope of the invention.

I claim:

1. An apparatus for handling a workpiece, comprising:
   (a) a longitudinally extensible, pressurizable, and laterally flexible bellows, said bellows having a wall with closed first end and an open second end for receiving pressure,
   (b) at least one longitudinally nonextensible and laterally flexible member separate and distinct from said bellows that is placed either inside or outside the wall, said member having first and second ends and attached to the bellows with the first end of the member attached near the closed first end of the bellows and the second end of the member attached near the open second end of the bellows, (c) means for pressurizing the bellows such that upon pressurization the nonextensible laterally flexible member constrains a longitudinal section of the bellows to be nonextensible while remaining longitudinal sections of the bellows expand, thereby causing the bellows to bend in the direction of the constrained side.

2. An apparatus as recited in claim 1, wherein the member is a thin metal band.

3. An apparatus as recited in claim 1, wherein the member is attached to the bellows by an element coiled around the bellows and member.

4. An apparatus as recited in claim 1, further comprising:
 a plurality of members positioned around the circumference of the bellows with one end of each member permanently attached and the other end selectably attachable, wherein the direction of bending is determined by the particular member(s) selectably attached to the bellows.

5. An apparatus as recited in claim 1, wherein the bellows is a rotatable bellows.

* * * * *